_US006624863B1_

United States Patent
Jacobs et al.

(10) Patent No.: US 6,624,863 B1
(45) Date of Patent: Sep. 23, 2003

(54) METHOD OF MAKING A PATTERNED RETARDER, PATTERNED RETARDER AND ILLUMINATION SOURCE

(75) Inventors: Adrian Marc Simon Jacobs, Headington (GB); Elizabeth Jane Acosta, Botley (GB); Jonathan Harrold, Sandford-on-Thames (GB); Michael John Towler, Botley (GB); Harry Garth Walton, Cowley (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/105,348

(22) Filed: Jun. 26, 1998

Related U.S. Application Data

(63) Continuation-in-part of application No. 08/928,891, filed on Sep. 12, 1997, now Pat. No. 6,046,849.

(30) Foreign Application Priority Data

Jun. 28, 1997 (GB) .............................. 9713627
Mar. 3, 1998 (GB) .............................. 9804501

(51) Int. Cl.$^7$ .......................................... G02F 1/1337
(52) U.S. Cl. ..................................... 349/126; 349/129
(58) Field of Search ................................ 399/126, 129, 399/187

(56) References Cited

U.S. PATENT DOCUMENTS

| | | | |
|---|---|---|---|
| 2,631,496 A | 3/1953 | Rehorn | 88/29 |
| 2,647,440 A | 8/1953 | Rehorn | 88/65 |
| 5,049,427 A | 9/1991 | Starzewski et al. | 428/40 |
| 5,264,964 A | 11/1993 | Faris | 359/465 |
| 5,327,285 A | 7/1994 | Faris | 359/483 |
| 5,537,144 A | 7/1996 | Faris | 348/58 |
| 5,555,186 A | 9/1996 | Shioya | 359/40 |
| 5,726,727 A * | 3/1998 | Shibahara et al. | 349/144 |
| 5,859,682 A * | 1/1999 | Kim et al. | 349/124 |
| 6,268,897 B1 * | 7/2001 | Kim et al. | 349/124 |
| 6,300,993 B1 * | 10/2001 | Kuo et al. | 349/117 |
| 6,313,898 B1 * | 11/2001 | Numano et al. | 349/129 |

FOREIGN PATENT DOCUMENTS

| | | |
|---|---|---|
| EP | 0348964 | 1/1990 |
| EP | 0397263 | 11/1990 |
| EP | 0625861 | 11/1994 |
| EP | 0631172 | 12/1994 |
| EP | 0689084 | 12/1995 |
| EP | 0720040 | 7/1996 |
| EP | 0721131 | 7/1996 |
| EP | 0726482 | 8/1996 |
| EP | 0750210 | 12/1996 |
| EP | 0772069 | 5/1997 |
| GB | 2296099 | 6/1996 |
| GB | 2306231 | 4/1997 |
| JP | 07294906 | 11/1995 |

OTHER PUBLICATIONS

Search Report for Application No. GB 9804501.6; Dated Jun. 24, 1998.
M. Schadt, SID Information Display, 12/97, pp. 14–18, 1997, "Photo–Alignment and Patterning of Liquid–Crystal Displays".
K. H. Yang, Jpn. Appl. Phys., vol. 31, pp. L1603–L1605, 1992, "Two–Domain 80°–Twisted Nematic Liquid Crystal Display for Grayscale Applications".
K. Takatori et al., Japan Display '92, pp. 591–594, 1992, "A Complementary TN LCD with Wide–Viewing–Angle Grayscale".
Y. Kato et al., Japanese Laid–Open Publication No. 63–158525, Laid Open on Jul. 1, 1988 with English translation.
M. Tani et al., SID Oct. 10–13 Monterey, pp. 103–111, 1994, "Progress in Color Filters for LCDs".
M. Schadt et al., Japanese Journal of Applied Physics, vol. 31, pp. 2155–2164, 1992, "Surface–Induced Parallel Alignment of Liquid Crystals".
D.J. Broer, SID 95 Digest, pp. 165–168, 1995, "Invited Paper: Molecular Architectures in Thin Plastic Films by In–SITU Photopolymerization of Reactive Liqjid Crystals".
S.M. Faris, SPIE, vol. 2177, pp. 180–195, 1994, "Novel 3–D Stereoscopic Imaging Technology".
U.S. application Ser. No. 08/573,155; filed Dec. 15, 1997 in the name of Woodgate et al.
Search Report for Application No. GB 97132627.9; Dated Oct. 3, 1997.
S. Pancharatnam, The Proceedings Of The Indian Academy Of Sciences, vol. XLI, No. 4, Sec. A, pp. 130–136, 1995, "Achromatic Combinations Of Birefringent Plates".
J.B. Eichenlaub, SPIE, vol. 2177, pp. 4–15, 1994, "An Autostereoscopic Display With High Brightness and Power Efficiency".
E. Nakayama et al., Proc. Third Internal Display Workshops, vol. 2, pp. 453–456, 1996, "2–D/3–D Compatible LC Display Without Special Glasses".
J. Chen et al., SID 95 Digest, pp. 865–868, 1995, "Four Domain TN–LCD Fabricated By Reverse Rubbing or Double Evaporation".
Search Report for Application No. 98305139.2–2205–; Dated Nov. 30, 1998.
Schadt et al.; Jpn. J. Appl. Phys. vol. 34 (1995), pp. L764–L767, Part 2, "Photo–Induced Alignment and Patterning of Hybrid Liquid Crystalline Polymer Films on Single Substrates".

\* cited by examiner

*Primary Examiner*—Toan Ton
(74) *Attorney, Agent, or Firm*—Renner, Otto, Boiselle & Sklar

(57) ABSTRACT

A method of making a patterned retarder of the present invention includes the steps of providing an alignment layer rubbing the alignment layer in a first rubbing direction, masking with a mask at least one first region of the alignment layer, to reveal at least one second region of the alignment layer, rubbing the at least one second region through the mask in a second rubbing direction different from the first rubbing direction, removing the mask, disposing on the alignment layer a layer of birefringent material whose optic axis is aligned by the alignment layer, and fixing the optic axis of the birefringent layer.

31 Claims, 6 Drawing Sheets

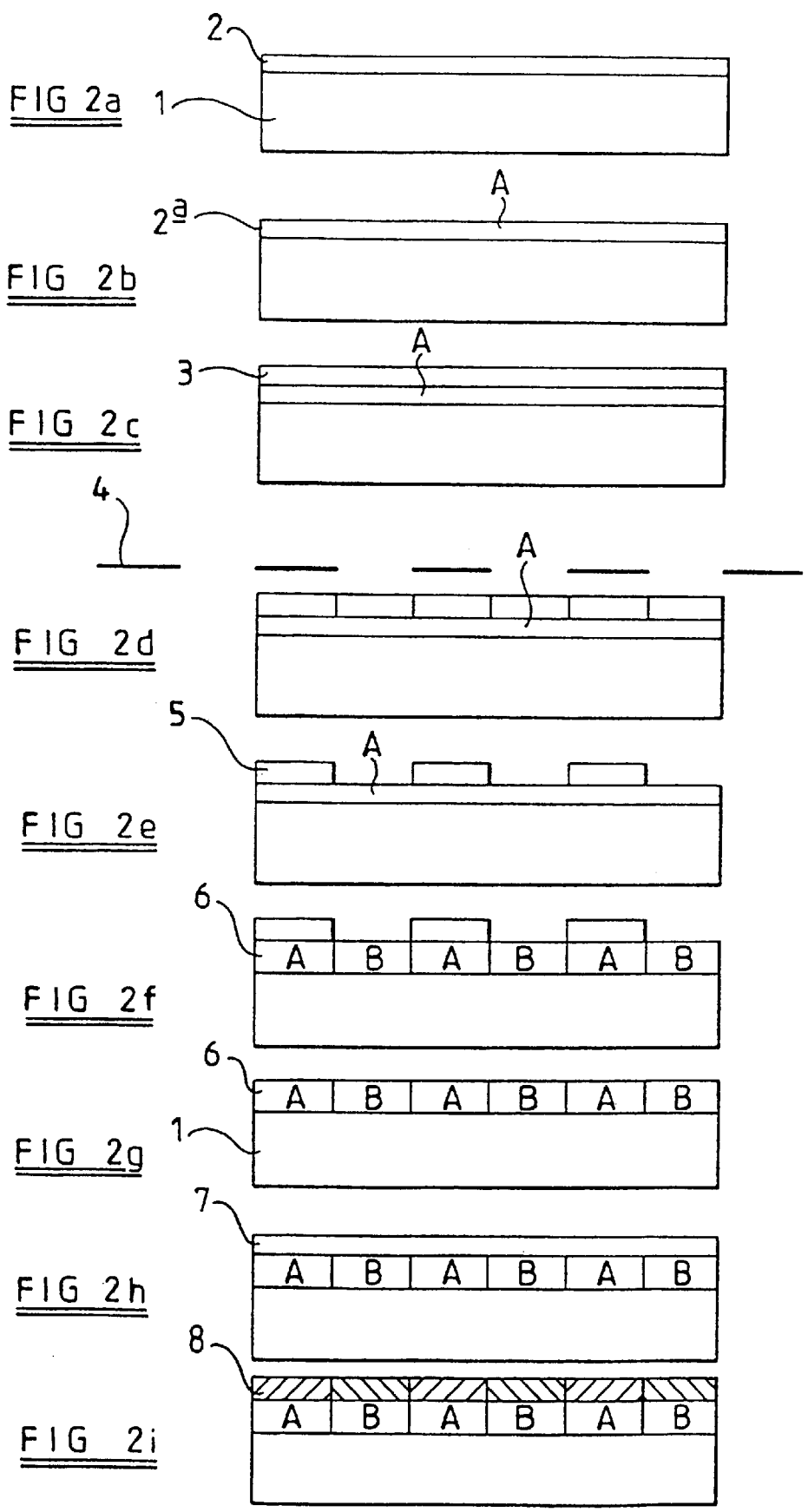

METHOD OF MAKING A PATTERNED RETARDER, PATTERNED RETARDER AND ILLUMINATION SOURCE

This is a CIP application of Ser. No. 08/928,891, filed Sep. 12, 1997, now U.S. Pat. No. 6,046,849.

BACKGROUND OF THE INVENTION

The present invention relates to a method of making a patterned retarder and to a patterned retarder made by such a method. Such an optical device has many applications, for instance in three-dimensional displays. The present invention also relates to an illumination source.

U.S. Pat. No. 5,327,285 discloses a process for making a patterned retarder by chemical etching or mechanical removal of a birefringent material such as polyvinyl alcohol (PVA). However, such a technique has the disadvantage that different regions of the pattern have different light absorption properties. To avoid or reduce this effect, a subsequent planarisation step may be performed but this requires an additional processing step. Further, the edge definition of the region is relatively poor. This technique cannot produce regions with different retarder orientations on a single substrate. Instead, two or more substrates must be processed and then stuck together with the correct registration.

EP 0 689 084 discloses a linearly photopolymerisable material which may be used as a patterned alignment layer for birefringent material. In order to produce a retarder having regions of different retarder orientations, two or more photolithographic steps are required in order to expose the linearly photopolymerisable material. These photolithographic steps must be correctly registered with each other, which adds to the difficulty and cost of manufacture. Further, materials of this type generally have zero or low pre-tilt and this may result in tilt disinclination walls in the birefringent material.

Patterned alignment layers for liquid crystal devices are disclosed in: "Four domain TN-LCD fabricated by reverse rubbing or double evaporation", Chen et al SID95 Digest p865, "Two domain 80 deg twisted nematic LCD for grey scale applications", Yang, Japanese Journal of Applied Physics, vol. 31, part 2, number 11B pL1603, and "A complementary TN LCD with wide viewing angle grey scale", Takatori et al, Japan Display 1992, p591. In particular, these publications disclose multi-domain LCDs for providing improved viewing performance.

SUMMARY OF THE INVENTION

"Photoalignment and patterning of LCDs", SID Information Display 12/97 describes new materials which allow processing with one mask step and controllable pre-tilt. This paper mentions that multiple rubbing techniques are unsuitable for high resolution patterns.

According to a first aspect of the invention, there is provided method of making a patterned retarder, comprising providing an alignment layer, rubbing the alignment layer in a first rubbing direction, masking with a mask at least one first region of the alignment layer to reveal at least one second region of the alignment layer, rubbing the or each second region through the mask in a second direction different from the first direction, removing the mask, disposing on the alignment layer a layer of birefringent material whose optic axis is aligned by the alignment layer, and fixing the optic axis of the birefringent layer.

The at least one first region may comprise a plurality of first regions, the at least one second region may comprise a plurality of second regions, and the first and second regions may be arranged as a regular array. The first and second regions may comprise first and second strips which alternate with each other.

The first rubbing direction may be the same as a first desired alignment direction of the or each first region and the second rubbing direction may be different from a second desired alignment direction, which is different from the first alignment direction, of the each or second region. The angle between the first and second rubbing directions may be greater than the angle between the first and second alignment directions.

The rubbing in the first rubbing direction may be lighter or harder than the rubbing in the second rubbing direction. Rubbing strength and pre-tilt may be controlled by parameters such as pile deformation (preferably set by the proximity of the substrate to the rubbing cloth), rubbing cloth rotational speed, substrate speed, number of rubs, cloth material and pile length. A lighter rub is preferably achieved by a smaller pile deformation i.e. the substrate is further from the cloth.

The birefringent material may comprise a polymerisable or cross-linkable material. The birefringent material may be polymerisable or cross-linkable by irradiation and the fixing may comprise irradiating the birefringent layer, for instance with ultraviolet radiation. The birefringent material may be polymerisable by heat or cationic polymerisation.

The birefringent layer may comprise a polymerisable liquid crystalline material. The liquid crystalline material may comprise liquid crystal monomers or oligomers or a mixture of monomers and oligomers.

The birefringent layer may comprise a diacrylate—containing liquid crystal material. The material may, for example, contain a mixture of mono-, di-, and tri-acrylates or epoxy resins and may contain a photoinitiator.

The birefringent layer may contain a dichroic material which may include at least one dichroic dye.

The masking may comprise photolithographically forming the mask on the alignment layer.

The masking may comprise disposing the mask as a formed mask on the alignment layer.

The alignment layer may comprise a layer which produces planar alignment of the birefringent layer, for example one of polyimide, polyamide, polyvinyl acetate and polyvinyl alcohol.

The alignment layer may be formed on a substrate, which may comprise a polariser.

The alignment layer may comprise a glass or plastics substrate.

The masking, the rubbing subsequent to the masking, and the removing may be repeated at least once for a different rubbing direction.

According to a second aspect of the invention, there is provided a method of making a patterned retarder, comprising providing an alignment layer, masking with a mask at least one first region of the alignment layer to reveal at least one second region of the alignment layer, rubbing the or each second region through the mask in a first direction, removing the mask, rubbing the alignment layer in a second direction different from the first direction, disposing on the alignment layer a layer of birefringent material whose optic axis is aligned by the alignment layer, and fixing the optic axis of the birefringent layer.

According to a third aspect of the invention, there is provided a patterned retarder made by a method according to the first or second aspect of the invention.

According to a fourth aspect of the invention, there is provided an illumination source comprising a light source, characterised by a plurality of first and second polarising beam splitters and a retarder according to the third aspect of the invention, each of the first splitters being arranged to transmit light of a first polarisation to a first region of the birefringent layer aligned by the first region of the alignment layer and to reflect light of a second polarisation orthogonal to the first polarisation to the second splitter of the pair, the second splitter of each pair being arranged to reflect the light of the second polarisation to a second region of the birefringent layer aligned by the second region of the alignment layer, and at least one of the first and second regions of the birefringent layer being arranged to change the polarisation of light from the respective splitter so that light leaving the first and second regions of the birefringent layer is in substantially the same uniform polarisation state.

It is thus possible to provide a method of making a patterned retarder using materials and photolithographic techniques in a manner which is compatible with standard liquid crystal device (LCD) fabrication. It is further possible to avoid the use of multiple photolithographic steps requiring accurate registration and alignment between each other, for instance as in EP 0 689 084. Any standard liquid crystal alignment layer may be used, including ones known to have suitable pre-tilt and voltage holding ratio properties for use as internal elements in LCD's. Provided the pre-tilt of the alignment layer is above a predetermined level, its exact value is not critical.

It is possible to provide a flat retarder such that planarisation or additional layers are not required. Any coloration of the birefringent material, for instance caused by weak absorption in part of the visible spectrum, is uniform throughout the retarder irrespective of the alignment directions of the alignment layer. Thus, variations in coloration caused, for instance, by removal of material or subsequent planarisation as in known arrangements can be substantially avoided. It is possible to provide patterning of much finer detail than can be provided by selective removal of material through mechanical means or chemical etching. The alignment process is compatible with birefringent materials of large refractive index anisotropy, for instance of the order of 0.2, so that it is possible to make waveplates which are much thinner than those which can be produced by known techniques based on PVA. For example, a PVA half-waveplate designed for a wavelength of 500 nm would be approximately 10 to 20 $\mu$m thick. Using wet chemical etching on a thick material such as this inevitably results in poor edge definition. This is a particular problem when the pitch of the pixels is of the same order as the layer thickness. Use of the present invention makes it possible to provide a waveplate which is approximately 1 to 2 $\mu$m thick. Such thin devices reduce consumption of materials and provide improved edge definition by reduced mask parallax and because material does not need to be removed. Because the techniques may be provided compatible with conventional LCD fabrication processes, the devices may be provided externally or internally of LCDs.

The invention will be further described, by way of example, with reference to the accompanying drawings, in which:

BRIEF DESCRIPTION OF THE DRAWINGS

FIG. 1b is a diagrammatic plan view of an alignment layer of the retarder of FIG. 1a;

FIG. 2 comprises FIGS. 2a to 2i and illustrates the steps in a method of making the patterned retarder shown in FIGS. 1a and 1b and constituting an embodiment of the invention;

Like reference numerals refer to like parts throughout the drawings.

DETAILED DESCRIPTION OF THE INVENTION

Figure 1A:
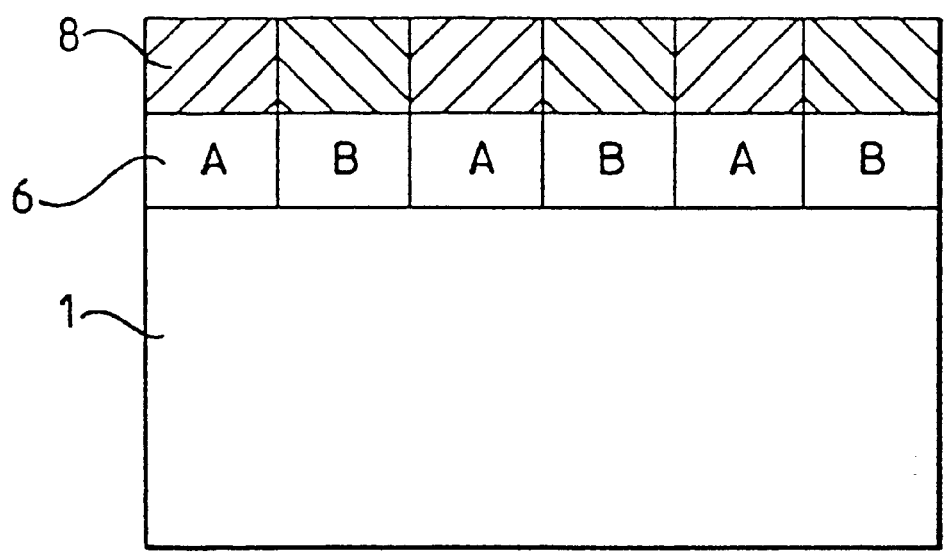
FIG. 1a is a diagrammatic sectional view of a patterned retarder constituting an embodiment of the invention.

The patterned retarder shown in FIGS. 1a and 1b comprises a substrate 1, for instance of glass, on which are formed an alignment layer 6 and birefringent layer 8 by a method as described hereinafter. The alignment layer 6 comprises a regular array of first regions A and regular array of second regions B. The regions A and B are formed as strips which alternate with each other. The first regions A have the same alignment direction 10 whereas the second regions B have the same alignment direction 11. The alignment direction 10 and 11 are different from each other and may, for example, be at 45° to each other.

The material of the birefringent layer 8 is of a type whose optic axis is aligned by the alignment direction of the alignment layer 6. Thus, the optic axes of the strip shaped regions of the birefringent layer 8 above the first regions A are aligned with the alignment direction 10 whereas the optic axes of the strip-shaped regions of the birefringent layer 8 above the second regions B are aligned with the alignment direction 11. As described hereinafter, the birefringent layer 8 is fixed following alignment by the alignment layer 6 so as to provide a patterned retarder having regions whose optic axes are aligned in different directions in accordance with the underlying alignment directions 10 and 11. By providing the birefringent layer 8 as a layer of uniform thickness with a retardance, for example, of 250 nanometers, it is possible to provide a half waveplate for visible radiation of wavelength 500 nanometers.

Figure 1B:
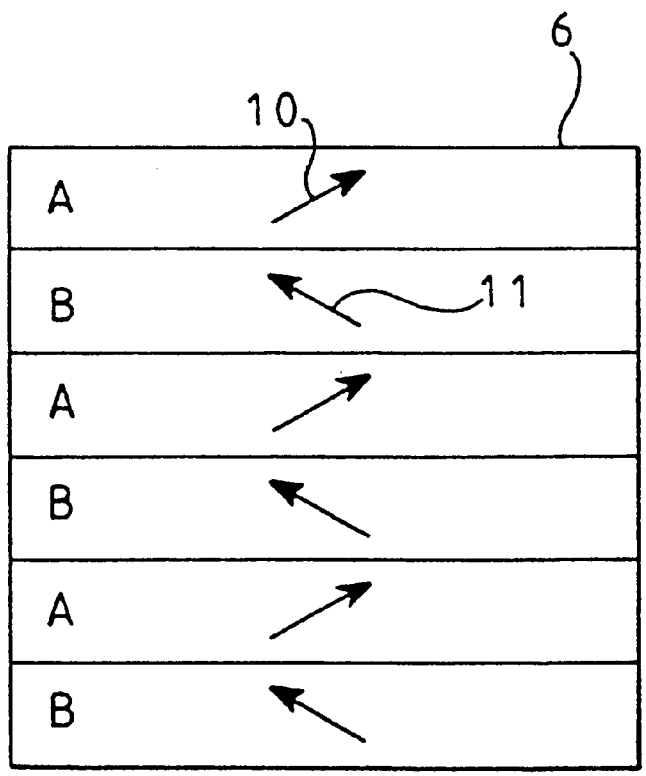

FIG. 2 illustrates a method of making the patterned retarder of FIGS. 1a and 1b by patterning the alignment of layer 6 using a multiple stage rubbing process. The first step shown in FIG. 2a comprises forming on the substrate 1 a layer 2 which, following processing, becomes the alignment layer 6. The substrate 1 may comprise a polished soda-lime glass which is cleaned by lightly rubbing with a clean room wipe, for instance in a detergent solution comprising ten per cent by volume of Decon 90 (RTM; available from Decon Laboratories Ltd) in de-ionised water. Further cleaning stages may be performed, for instance using an alkali solution, de-ionised water and propan-2ol.

As an alternative, the substrate 1 may comprise components which are suitable for incorporation in an LCD. For instance, the substrate 1 may comprise low alkali glass such as Corning 7059 (available from Corning Incorporated, New York, USA). Such a glass substrate may be coated with a transparent conductor, such as indium tin oxide (ITO), before application of the layer 2. Also, a black mask and colour filter array may be applied to the substrate before application of the layer 2.

As another alternative, the substrate 1 may comprise a plastics material.

As another alternative, the substrate 1 may comprise a polariser with which the finished patterned retarder is required to cooperate.

The layer 2 comprises any material which is capable of being deposited on the substrate 1 and of being rubbed to provide alignment of the birefringent layer 8. For instance, the layer 2 may comprise polyimide such as the material known as P12555 available from Du Pont. This material may be dissolved in the ratio 1:20 in a thinner known as T9039 available form Du Pont. The solution is applied to the substrate 1 by spinning in an open bowl spinner at 4000 revolutions per minute (rpm) for 40 seconds. The coated substrate is heated to 90° centigrade for 5 minutes and then cured at 250° for 1 hour.

The polyimide layer 2 is then unidirectionally rubbed throughout its free surface. For instance, the layer 2 may be rubbed three times with a rubbing cloth on a roller rotating at 3000 rpm at a pile deformation of 0.2 mm and with a forward speed of 20 mm per second. The rubbing cloth is a fabric comprising rayon (RTM) fibres with a 2 mm pile. In the example illustrated, the first rubbing is performed at an angle of +22.5° to a reference direction so as to form a layer 2a shown in FIG. 2b having the uniform rubbing direction 10 corresponding to the first regions A shown in FIG. 1b.

Other materials which can be rubbed to impose a desired alignment direction on the birefringent layer may be used as the layer 2. Such materials include polyamide, polyvinyl acetate and polyvinyl alcohol. Alternatively, if there is no requirement for alignment pre-tilt, the layer 2 may be omitted and the glass substrate 1 may be rubbed directly.

After the first rubbing, masking of the layer 2a is performed as illustrated in FIGS. 2c to 2e using standard photolithographic techniques. The rubbed surface of the polyimide layer 2a is spin-coated with a positive photoresist 3, for instance comprising two parts per volume of photoresist Microposit S1805 series to one part Microposit EC solvent (these materials are available from Shipley, Europe Limited) at 4500 rpm for 40 seconds to provide a layer thickness of approximately 200 nanometers. The layer 3 is soft-baked, for instance at 90° centigrade for 30 minutes or at 95° centigrade for two minutes, to evaporate solvent. This is followed by a two-second exposure to ultraviolet light having an intensity of 6.9 mW/cm$^2$ and a wavelength of 365 nanometers through a photomask 4 in hard contact mode on a mask aligner (available from Karl Suss). This is illustrated in FIG. 2d and provides optimum edge resolution. The mask may, for example, have features of the order of 100 micrometers, although the technique is capable of providing much finer resolutions, for instance of the order of 5 micrometers as illustrated hereinafter.

The spatially selective exposure of the photoresist 3 may be performed by any suitable radiation source with or without the mask 4. For example, the irradiation may be performed without a mask using an ultraviolet laser.

Following exposure, the photoresist is developed, for instance for one minute in the developer Microposit 351CD31 (available from Shipley, Europe Limited) to remove the photoresist from the second regions which were exposed to the ultraviolet so as to leave a reproduction of the mask pattern in the photoresist as illustrated at 5 in FIG. 2e and covering the first regions. The substrate 1 and overlying layers are, for example, rinsed in de-ionised water for two minutes to ensure complete removal of all of the exposed photoresist so as to avoid contamination of subsequent layers. The photoresist is then hard-baked, for instance at 110 degrees centigrade for 50 minutes, so as to make it more resistant to the subsequent rubbing process.

As an alternative to the photo-lithographic masking technique, a preformed thin mask, for instance, of metallic or polymeric material, may be disposed on the layer 2a for the subsequent rubbing.

Figure 3A:
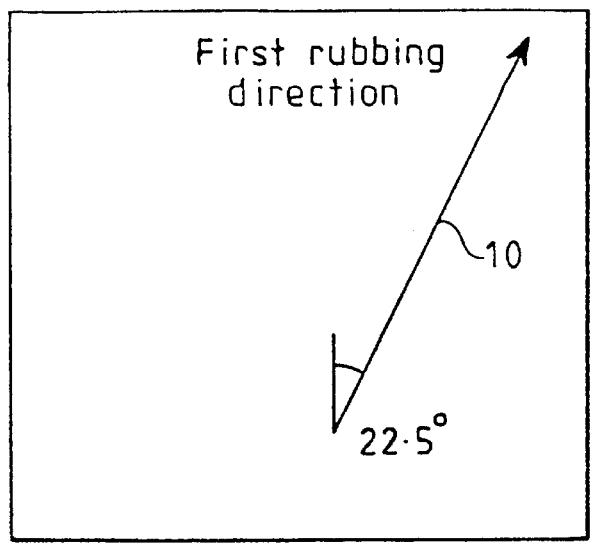
FIG. 3 illustrates rubbing directions used in the method illustrated in FIG. 2.
Figure 3B:
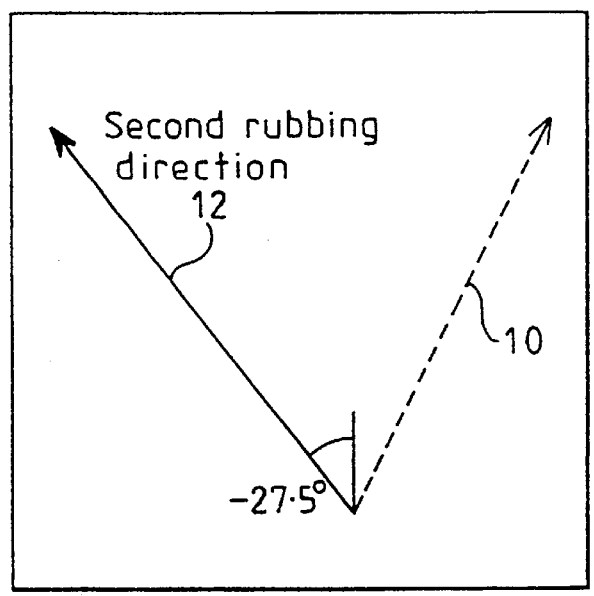
Figure 3C:
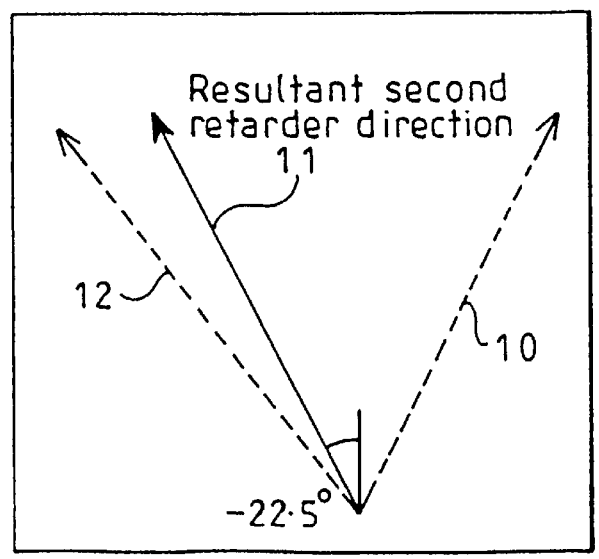

In the example illustrated, the second alignment direction 11 is required to be at minus 22.5 degrees to the reference direction so that the alignment directions 10 and 11, and hence the optic axes of the birefringent material above the regions A and B, are at a relative angle of 45 degrees. It has been found that the first rubbing has a residual effect such that re-rubbing of the polyimide in a second direction causes the resultant alignment direction to be different from the direction of the second rubbing. The second rubbing can therefore be offset relative to the required second alignment direction 11 so as to compensate for this. For instance, the second rubbing may be at −27.5 degrees. The upper part of FIG. 3 illustrates the first rubbing direction which corresponds to the desired alignment direction 10. The middle part of FIG. 3 illustrates the second rubbing direction 12 and the lower part of FIG. 3 illustrates the resultant alignment direction.

The second rubbing is performed three times at a pile deformation of 0.3 mm and under the same conditions as the first rubbing described hereinbefore. Thus, the twice-rubbed alignment layer 6 is formed as illustrated in FIG. 2f. The photoresist 5 is then removed to leave the finished substrate 1 and alignment layer 6 as shown in FIG. 2g. Because standard photoresist stripper can damage polyimide, the remaining photoresist 5 is removing by dipping in acetone for two minutes and rinsing in de-ionised water for three minutes. This is followed by dipping in isopropyl alcohol solvent to avoid watermarks left from deionised water followed by drying with a nitrogen stream. Alternatively, the resist may be removed by uniform exposure to ultraviolet radiation and dipping in 351CD31 developer.

The method illustrated in FIG. 2 provides first regions A and second regions B having first and second alignment direction 10 and 11, respectively. However, the process steps illustrated in FIGS. 2c and 2g may be repeated any number of times to provide sets of regions of different alignment directions.

The alignment layer is dehydrated by being baked at 170 degrees centigrade for 20 minutes and is then allowed to cool to room temperature in order to improve the adhesion of other layers onto the pattered polyimide surface.

As shown in FIG. 2h, a layer 7 for forming the birefringent or retardance layer is applied to the alignment surface of the alignment layer 6. The layer 7 is formed by spin-coating a birefringent reactive mesogen solution. The solution comprises a diacrylate-containing mixture known as RM257 (available form Merck UK Ltd, Poole) to obtain a retarder, for instance designed to be a halfwave plate at 500 nanometers.

The reactive mesogen solution is prepared by adding one part by weight of RM257 and approximately 1% of a photoinitiator known as Darocur 4265 (available form CIBA Geigy Ltd and having an activation peak of approximately 365 nanometers) to three parts toluene so as to improve alignment. Further, the concentration of the photoinitiator may be varied, for instance between approximately 0.1% and approximately 10%, or other photoinitiator materials may be used.

The reactive mesogen solution is agitated and heated to approximately 80 degrees centigrade for a few minutes to ensure that the reactive mesogen is completely dissolved. The solution is then cooled to room temperature. Prior to spin coating, the solution may be filtered through a 0.2 micrometer PTFE filter to eliminate any insoluble impurities.

For some applications, a dichroic dye or other dichroic material may be added to the solution before application to the alignment layer 6. In this case, the dichroic dye and the birefringent material both align with the underlying direction to produce a patterned polariser.

The birefringent material may be any material which is capable of adopting the orientation of the alignment layer and of being fixed in that direction. Suitable materials include liquid crystal polymers, reactive mesogen materials and polymerisable liquid crystals.

In order to obtain a patterned half-wave plate for radiation of 500 nanometer wavelength, the layer 7 is applied by spin-coating the reactive mesogen solution for 30 seconds at 1650 rpm. The resulting device is heated, for instance for three minutes at 85 degrees centigrade, to anneal out any defects and to evaporate the solvent. The reactive mesogen material orients its optic axis to the alignment direction of the immediately adjacent underlying alignment layer. The birefringent material is then polymerised by exposure to ultra-violet light in a substantially oxygen-free (e.g. nitrogen) atmosphere, for instance for at least 5 minutes with an irradiation intensity of approximately 0.5 mW/cm$^2$, to provide the patterned retarder with the fixed birefringent layer 8 as illustrated in FIG. 2i.

The spin speeds, temperatures and time periods mentioned hereinbefore are given by way of example and may be varied as required, for instance, for different materials and different substrate sizes. Other known coating techniques including roll coating and blade coating may be used either singly or in combination with each other. Also, the rubbing process conditions and material may be varied, for instance to encompass any known techniques. In one example, first rubbing may be made lighter to reduce its effect and to limit the need to offset the direction of the second rubbing from the desired second alignment direction. Also, the required offset angle may be reduced by rubbing in a direction 180 degrees from that used previously. For instance, in the example described hereinbefore where the first rubbing occurs at +22.5 degrees to the reference direction, the second rubbing may be performed in the direction –207.5 degrees relative to the reference direction. Rubbing in substantially the opposite direction in this manner may help to reduce the effects of the first rubbing.

Figure 4A:
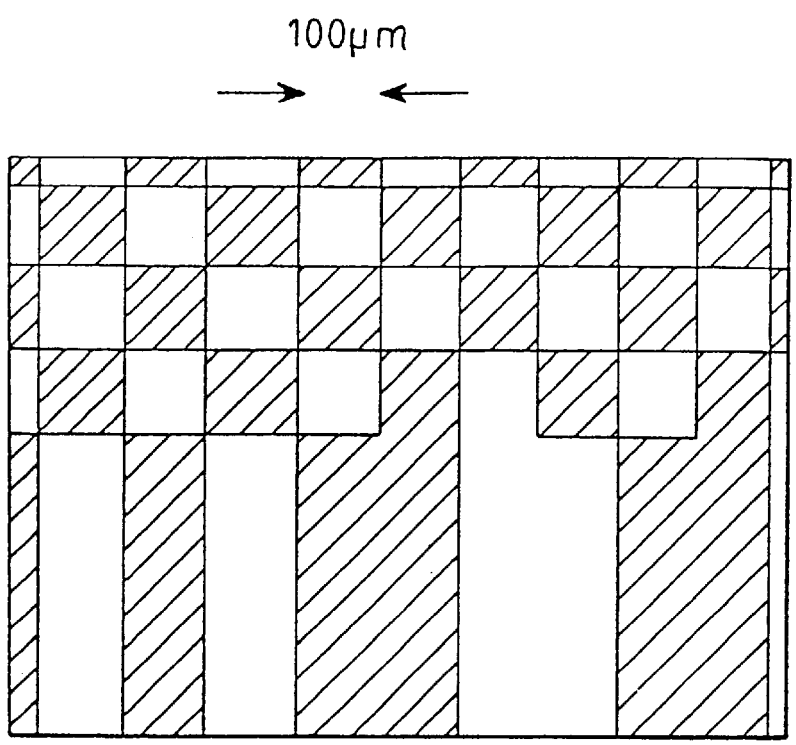
FIG. 4 illustrates patterned retarders made by the method illustrated in FIG. 2.
Figure 4B:
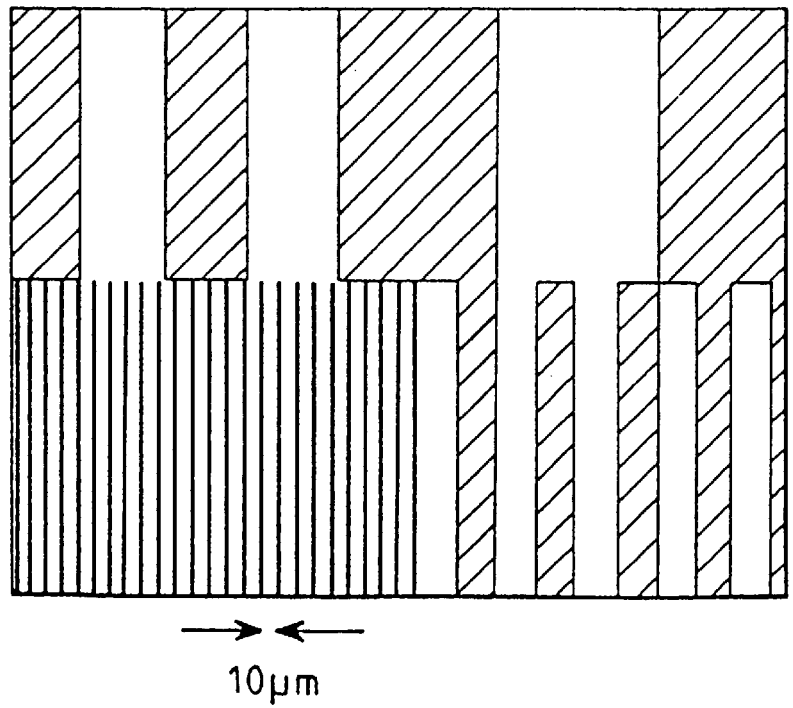

FIG. 4 illustrates two examples of patterns and pattern feature sizes which may be achieved using the method illustrated in FIG. 2. The upper part of FIG. 4 shows a pattern having feature sizes of the order of 100 micrometers. However the method is capable of producing much finer details and the lower part of FIG. 4 illustrates feature sizes of the order of 10 micrometers or less.

Figure 5A:
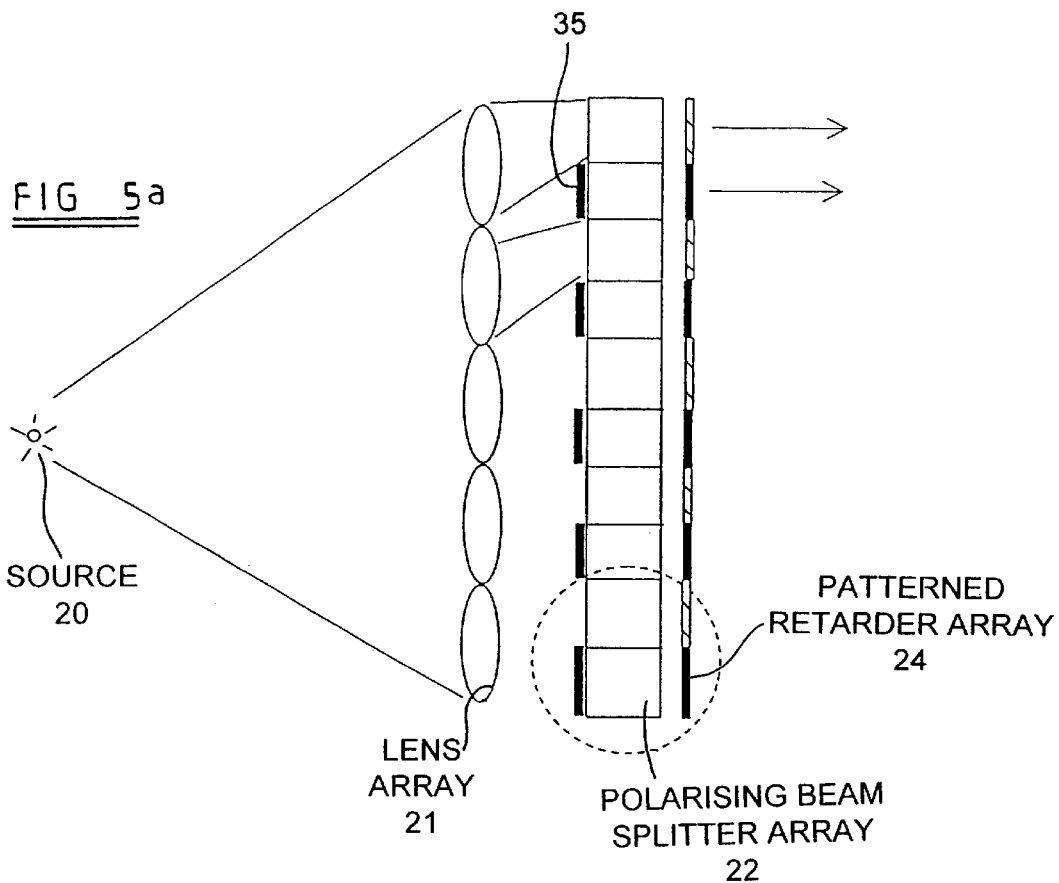
FIG. 5 illustrates an application of the retarder of FIGS. 1a and 1b to provide a polarised light source.
Figure 5B:
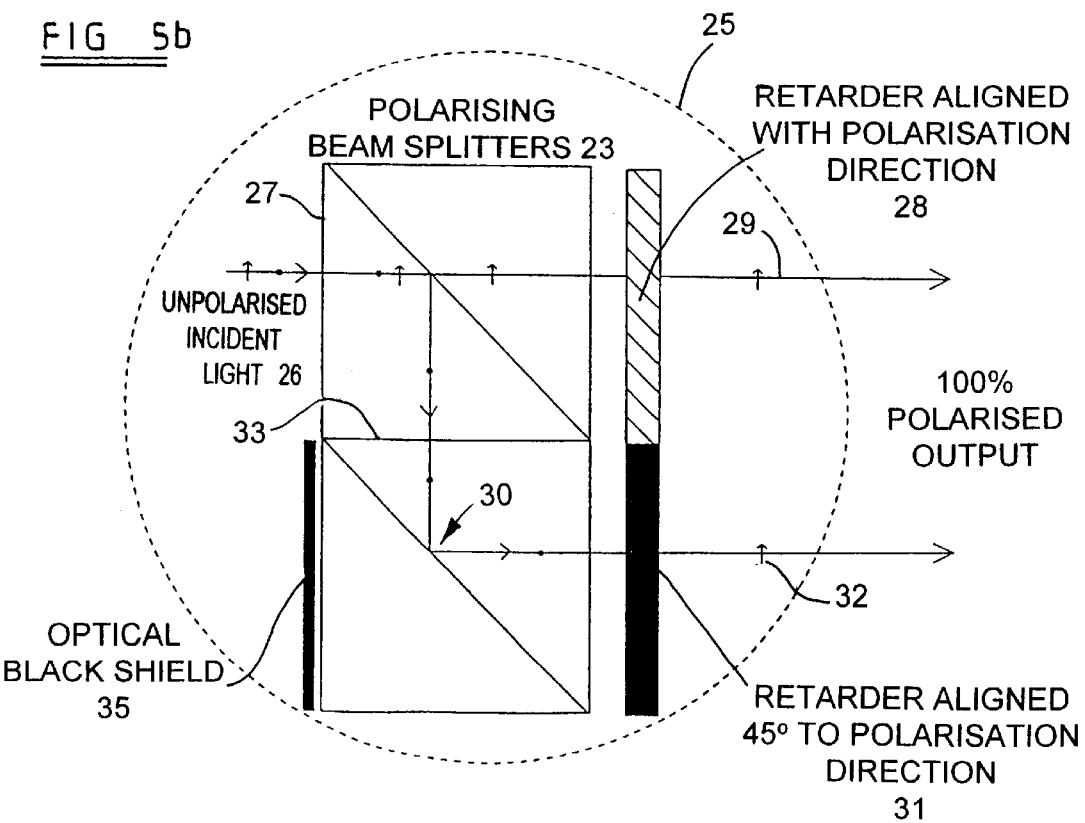
Figure 6A:
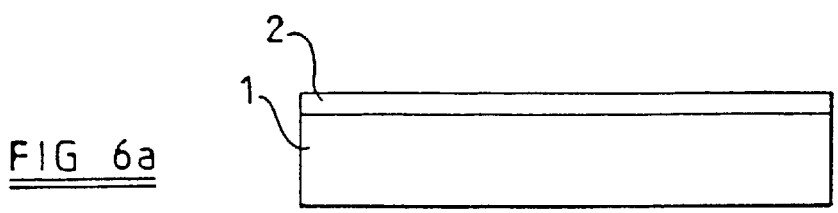
FIG. 6 comprises FIGS. 6(a) to 6i and illustrates the steps in another method of making a patterned retarder constituting an embodiment of the invention.
Figure 6B:
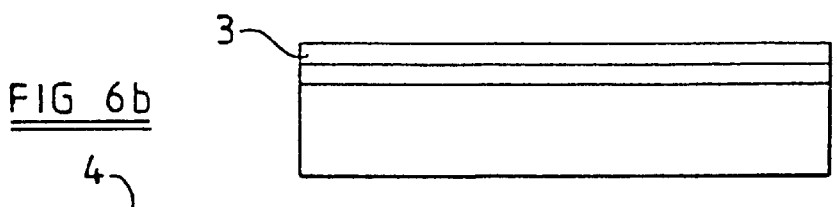
Figure 6C:
Figure 6D:
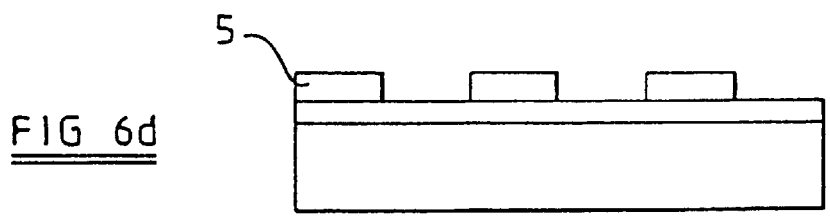
Figure 6E:
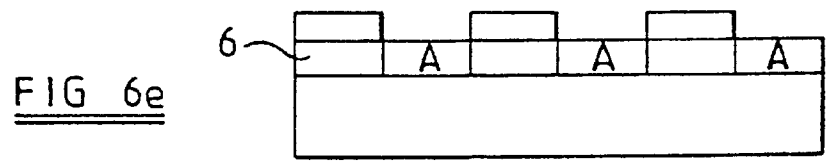
Figure 6F:
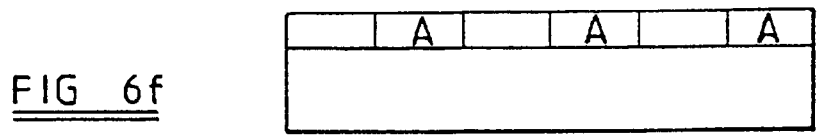
Figure 6G:
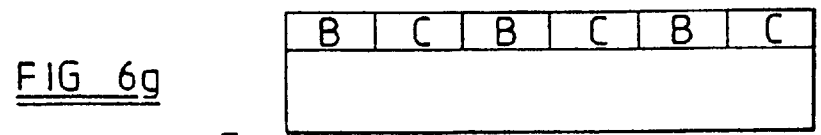
Figure 6H:
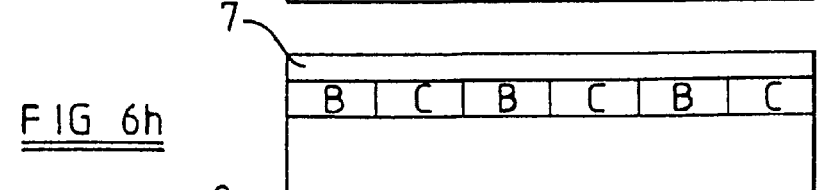
Figure 6I:
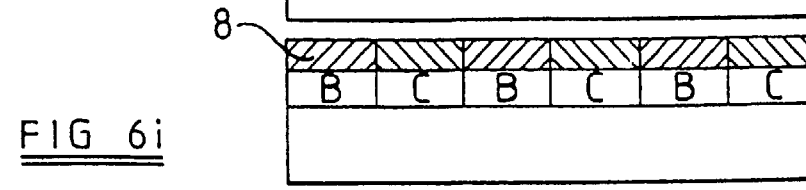

As mentioned hereinbefore, the patterned retarder may be used in displays, for instance of the three-dimensional type as disclosed in GB 2 296 151, EP 0 721 132, GB 2 317 295 and EP 0 829 744. FIG. 5 shows another application of the patterned retarder as part of an otherwise known type of polarised light source. The polarised light source comprises an unpolarised light emitting arrangement shown diagrammatically as a small source 20. Divergent light from the source 20 is collimated by a lens array 21 and supplied to a polarising beam splitter array 22. The array 22 comprises polarising beam splitters 23, each of which is aligned with a respective region of the patterned retarder 24.

As shown in more detail to enlarged scale at 25 in FIG. 5, unpolarised incident light 26 is incident at the input surface 27 of each of the polarising beam splitters 23 aligned with first regions 28 of the retarder 24. P polarised light passes through the beam splitter to the first region 28, whose optic axis is aligned parallel to the polarisation direction. The first regions 28 of the retarder 24 therefore have no effect on the polarisation state so that P polarised light 29 leaves the first regions 28.

S polarised light is reflected by each beam splitter 23 aligned with a respective first region 28 and is again reflected by the adjacent beam splitter as shown at 30. The S polarised light is thus directed to the second retarder regions 31 whose optic axes are aligned at 45 degrees to the polarisation direction of the S polarised incident light. The polarisation direction of the light passing through the second regions is 'rotated' about the optic axis so that the light leaving the second regions 31 is P polarised as indicated at 32. Thus, substantially all of the light passing through the beam splitter array 22 and the patterned retarder 24 is emitted as 100% polarised light of P polarisation. The polarised light source therefore makes efficient use of the light emitted by the unpolarised source 20. Optional black shields 35 are disposed on opposite surfaces of the beam splitters 23 from the second retarder regions 31 so as to prevent direct passage of light therethrough.

Although not illustrated, the regions 29 and 31 may be swapped so as to produce substantially 100% S polarisation. The polarising beamsplitter array may also be made by cutting and polishing slabs of tilted material as is known. In this case the internal surface 33 is not present.

FIG. 6 illustrates another method of making a patterned retarder using the same basic materials and techniques as described hereinbefore with reference to FIG. 2 but with a different order of process steps. The steps shown in FIG. 6a to 6d are substantially the same as the steps illustrated in FIGS. 2a and 2c to 2e, respectively. However, the rubbing step illustrated in FIG. 2c is omitted from the method illustrated in FIG. 6. Instead, the first rubbing is performed through the mask formed by the photoresist 5 so as to provide the regions having the rubbing direction A illustrated in FIG. 6e. The photoresist 5 is then removed as illustrated in FIG. 6f, for instance in the same way as described hereinbefore. The whole of the layer 6 is then rubbed in the direction B. This results in the regions which were previously unrubbed having the alignment direction B whereas the regions which were previously rubbed in the direction A have an effective orientation C which is different from A because of the effect of rubbing a previously rubbed region as described hereinbefore. The difference between the effective orientations of the regions B and C results solely from the residual effect of the first rubbing and it may be advantageous to perform the first rubbing harder than the second rubbing.

What is claimed is:

1. A method of making a patterned retarder, comprising the steps of providing an alignment layer, rubbing the alignment layer in a first rubbing direction, masking with a mask at least one first region of the alignment layer which has undergone said rubbing in the first direction, to reveal at least one second region of the alignment layer which has also undergone said rubbing in the first direction, rubbing the at least one second region through the mask in a second rubbing direction different from the first rubbing direction and at an acute angle, or obtuse angle from the first rubbing direction, removing the mask, disposing on the alignment layer a layer of birefringent material whose optic axis is aligned by the alignment layer, and fixing the optic axis of the birefringent layer.

2. A method as claimed in claim 1, in which the at least one first region comprises a plurality of first regions, the at least one second region comprises a plurality of second regions, and the first and second regions are arranged as a regular array.

3. A method as claimed in claim 2, in which the first and second regions comprise first and second strips which alternate with each other.

4. A method as claimed in claim 1, in which the first rubbing direction is substantially the same as a first desired alignment direction of the at least one first region and the second rubbing direction is different from a second desired alignment direction, the second desired alignment direction being different from the first desired alignment direction of the at least one second region.

5. A method as in claim 4, in which the angle between the first and second rubbing directions is greater than the angle between the first and second alignment directions.

6. A method as claimed in claim 4, in which the rubbing in the first rubbing direction is lighter than the rubbing in the second rubbing direction.

7. A method as claimed in claim 4, in which the alignment layer comprises a compound selected from the group consisting of a polyimide, a polyamide, a polyvinyl acetate and a polyvinyl alcohol.

8. A patterned retarder made by a method as claimed in claim 4.

9. An illumination source comprising a light source comprising a plurality of pairs of first and second polarising beam splitters and a retarder as claimed in claim 8, each of the first polarising beam splitters being arranged to transmit light of a first polarisation to a first region of a birefringent layer aligned by the first region of an alignment layer and to reflect light of a second polarisation orthogonal to the first polarisation to the second polarising beam splitters of each pair of the plurality of pairs of first and second polarising beam splitters, the second polarising beam splitters of each pair of the plurality of pairs of first and second polarising beam splitters being arranged to reflect light of the second polarisation to a second region of the birefringent layer aligned by the second region of the alignment layer, and at least one of the first and second regions of the birefringent layer being arranged to change the polarisation of light from the respective polarising beam splitters so that light leaving the first and second regions of the birefringent layer is in substantially the same uniform polarisation state.

10. A method as claimed in claim 1, in which the rubbing in the first rubbing direction is lighter than the rubbing in the second rubbing direction.

11. A method as claimed in claim 1, in which the birefringent material comprises a polymerisable or cross-linkable material.

12. A method as claimed in claim 11, in which the layer of birefringent material contains a dichroic material.

13. A method as claimed in claim 12, in which the dichroic material includes at least one dichroic dye.

14. A method as claimed in claim 11, in which the birefringent material is polymerisable or cross-linkable by irradiation and the fixing comprises irradiating the layer of birefringent material.

15. A method as claimed in claim 14, in which the layer of birefringent material is irradiated with ultraviolet radiation.

16. A method as claimed in claim 11, in which the birefringent material is polymerisable by heat or cationic polymerisation.

17. A method as claimed in claim 1, in which the layer of birefringent material comprises a polymerisable liquid crystalline material.

18. A method as claimed in claim 17, in which the polymerisable liquid crystalline material comprises at least one of liquid crystal monomers and oligomers.

19. A method as claimed in claim 1, in which the layer of birefringent material comprises a reactive mesogen.

20. A method as claimed in claim 1, in which the layer of birefringent material comprises a diacrylate-containing liquid crystal material.

21. A method as claimed in claim 1, in which the layer of birefringent material contains a dichroic material.

22. A method as claimed in claim 21, in which the dichroic material includes at least one dichroic dye.

23. A method as claimed in claim 1, in which the masking comprises photolithographically forming the mask on the alignment layer.

24. A method as claimed in claim 1, in which the masking comprises disposing the mask as a pre-formed mask on the alignment layer.

25. A method as claimed in claim 1, in which the alignment layer comprises a compound selected from the group consisting of a polyimide, a polyamide, a polyvinyl acetate and a polyvinyl alcohol.

26. A method as claimed in claim 1, in which the alignment layer is formed on a substrate.

27. A method as claimed in claim 26, in which the substrate comprises a polariser.

28. A method as claimed in claim 1, in which the alignment layer comprises a glass or plastics substrate.

29. A method as claimed in claim 1, in which the masking, the rubbing subsequent to the masking, and the removing are repeated at least once for a different direction.

30. A patterned retarder made by a method as claimed in claim 1.

31. An illumination source comprising a light source comprising a plurality of pairs of first and second polarising beam splitters and a retarder as claimed in claim 30, each of the first polarising beam splitters being arranged to transmit light of a first polarisation to a first region of a birefringent layer aligned by the first region of an alignment layer and to reflect light of a second polarisation orthogonal to the first polarisation to the second polarising beam splitters of each pair of the plurality of pairs of first and second polarising beam splitters, the second polarising beam splitters of each pair of the plurality of pairs of first and second polarising beam splitters being arranged to reflect light of the second polarisation to a second region of the birefringent layer aligned by the second region of the alignment layer, and at least one of the first and second regions of the birefringent layer being arranged to change the polarisation of light from the respective polarising beam splitters so that light leaving the first and second regions of the birefringent layer is in substantially the same uniform polarisation state.

* * * * *